United States Patent
Xu et al.

(10) Patent No.: US 12,165,506 B2
(45) Date of Patent: Dec. 10, 2024

(54) METHOD AND DEVICE FOR PREDICTING TRAFFIC FLOW OR TRAVEL TIME PERIOD

(71) Applicant: ALIBABA GROUP HOLDING LIMITED, Grand Cayman (KY)

(72) Inventors: Shenkun Xu, Beijing (CN); Rui Dai, Beijing (CN); Shuai Li, Beijing (CN); Chenguang Ji, Beijing (CN); Kaikui Liu, Beijing (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 620 days.

(21) Appl. No.: 17/233,028

(22) Filed: Apr. 16, 2021

(65) Prior Publication Data
US 2021/0233391 A1 Jul. 29, 2021

Related U.S. Application Data

(63) Continuation of application No. PCT/CN2019/110269, filed on Oct. 10, 2019.

(30) Foreign Application Priority Data

Oct. 18, 2018 (CN) .......................... 201811218071.3

(51) Int. Cl.
*G08G 1/01* (2006.01)
*G01C 21/34* (2006.01)
(Continued)

(52) U.S. Cl.
CPC ....... *G08G 1/0129* (2013.01); *G01C 21/3453* (2013.01); *G01C 21/3691* (2013.01); *G06N 3/08* (2013.01)

(58) Field of Classification Search
CPC .............. G08G 1/0129; G01C 21/3453; G01C 21/3691; G06N 3/08; G06N 3/045; G06N 3/044
See application file for complete search history.

(56) References Cited

U.S. PATENT DOCUMENTS 9,558,661 B2  1/2017  Shi et al.
2010/0094532 A1*  4/2010  Vorona ............... G08G 1/09675
701/119

(Continued)

FOREIGN PATENT DOCUMENTS

AU  2018102176 A4  9/2020
CN  102353380 A  2/2012

(Continued)

OTHER PUBLICATIONS

Yu et al., Spatiotemporal Recurrent Convolutional Networks for Traffic Prediction in Transportation Networks, Jun. 26, 2017, Sensors 2017, 17, 1501; doi:10.3390/s17071501 (Year: 2017).*

(Continued)

*Primary Examiner* — Tyler J Lee
*Assistant Examiner* — Yufeng Zhang
(74) *Attorney, Agent, or Firm* — Sheppard Mullin Richter & Hampton LLP

(57) ABSTRACT

A method for predicting traffic flow or a travel time, includes: obtaining navigation route data; obtaining, according to the navigation route data, navigation flow of a road within a prediction time period; obtaining real-time traffic flow, a real-time travel time, past traffic flow, and a past travel time of the road; and training a neural network with the real-time travel time, the past travel time, the real-time traffic flow, the past traffic flow, and the navigation flow of the road to obtain predicted traffic flow or a predicted travel time of the road within the prediction time period.

17 Claims, 2 Drawing Sheets

(51) Int. Cl.
   *G01C 21/36*   (2006.01)
   *G06N 3/08*    (2023.01)

(56) References Cited

U.S. PATENT DOCUMENTS

| | | | |
|---|---|---|---|
| 2014/0114556 A1* | 4/2014 | Pan | G08G 1/00 |
| | | | 701/119 |
| 2015/0228187 A1 | 8/2015 | Sebastian et al. | |
| 2020/0074864 A1* | 3/2020 | McErlean | G08G 1/0129 |

FOREIGN PATENT DOCUMENTS

| | | | |
|---|---|---|---|
| CN | 102693633 B | 3/2014 |
| CN | 103903468 A | 7/2014 |
| CN | 104101347 A | 10/2014 |
| CN | 105046953 A | 11/2015 |
| CN | 103730006 B | 12/2015 |
| CN | 103247177 B | 1/2016 |
| CN | 105389980 A | 3/2016 |
| CN | 105513350 A | 4/2016 |
| CN | 103871246 B | 5/2016 |
| CN | 105654729 A | 6/2016 |
| CN | 102708679 B | 12/2016 |
| CN | 104064023 B | 12/2016 |
| CN | 104821082 B | 1/2017 |
| CN | 104464291 B | 2/2017 |
| CN | 105118294 B | 3/2017 |
| CN | 103150609 B | 5/2017 |
| CN | 106971547 A | 7/2017 |
| CN | 107702729 A | 2/2018 |
| CN | 107730887 B | 2/2018 |
| CN | 108307312 A | 7/2018 |
| CN | 105788249 B | 9/2018 |
| CN | 108647834 A | 10/2018 |
| CN | 106448151 B | 12/2019 |
| CN | 107967532 B | 7/2020 |
| CN | 109658695 B | 9/2020 |
| CN | 108510741 B | 10/2020 |
| CN | 109215349 B | 12/2020 |
| CN | 110675623 B | 12/2020 |
| CN | 109035779 B | 1/2021 |
| CN | 110264709 B | 2/2021 |
| CN | 109492814 B | 4/2021 |

OTHER PUBLICATIONS

Written Opinion of the International Searching Authority and International Search Report for PCT Application No. PCT/ CN2019/ 110269 mailed on Jan. 7, 2020.
International Preliminary Report on Patentability Chapter I for PCT Application No. PCT/CN2019/110269 mailed on Apr. 29, 2021.

* cited by examiner

METHOD AND DEVICE FOR PREDICTING TRAFFIC FLOW OR TRAVEL TIME PERIOD

CROSS REFERENCE TO RELATED APPLICATIONS

This application is a continuation application of International Application No. PCT/CN2019/110269, filed on Oct. 10, 2019, which claims priority to and benefits of Chinese Patent Application No. 201811218071.3 filed on Oct. 18, 2018. The content of the above-referenced applications is incorporated herein by reference in their entirety.

TECHNICAL FIELD

This application relates to the technical field of dynamic traffic, and in particular, to a method and device for predicting traffic flow or a travel time.

BACKGROUND

A travel time refers to a time it takes for a vehicle to travel through a road from an entry point to an exit point. Traffic flow refers to a quantity of vehicles on a road within a unit time (such as one minute). Travel time prediction means predicting a travel time of a vehicle to travel through a road at a future moment (which has not arrived yet). Traffic flow prediction refers to predicting a quantity of vehicles on a road at a future moment. In existing technologies, traffic flow or a travel time is predicted based on past traffic flow and a past travel time of a road, and some solutions also consider real-time traffic flow and a real-time travel time of the road. During research on the existing technologies, it is found that predicted traffic flow or a predicted travel time of the road obtained by only considering the past traffic flow, the past travel time, the real-time traffic flow, and the real-time travel time is greatly different from actual traffic flow or an actual travel time of the road. Since the accuracy of the predicted traffic flow or the predicted travel time is crucial to travel services, it is necessary to provide a technical solution that can obtain predicted traffic flow or a predicted travel time that is closer to an actual situation.

SUMMARY

In view of the foregoing problem, this application provides a method and a device for predicting traffic flow or a travel time, which can obtain predicted traffic flow or a predicted travel time that is closer to an actual situation.

To achieve the foregoing objective, this application mainly provides the following technical solutions:

In one aspect, this application provides a method for predicting traffic flow or a travel time, including: obtaining massive navigation route data returned by a terminal: obtaining, according to the massive navigation route data, navigation flow of a to-be-predicted road within a prediction time period: obtaining real-time traffic flow, a real-time travel time, past traffic flow, a past travel time, and navigation flow of the to-be-predicted road; and training a neural network with the real-time travel time, the past travel time, the real-time traffic flow; the past traffic flow, and the navigation flow of the to-be-predicted road to obtain predicted traffic flow or a predicted travel time of the to-be-predicted road within the prediction time period.

In another aspect, this application provides a processor configured to execute a program, where the program, when executed, performs the method for predicting traffic flow or a travel time provided in this application.

In yet another aspect, a method for predicting traffic flow or a travel time is provided. The method includes: obtaining navigation route data: obtaining, according to the navigation route data, navigation flow of a road within a prediction time period: obtaining real-time traffic flow; a real-time travel time, past traffic flow, and a past travel time of the road; and training a neural network with the real-time travel time, the past travel time, the real-time traffic flow, the past traffic flow, and the navigation flow of the road to obtain predicted traffic flow or a predicted travel time of the road within the prediction time period.

In some embodiments, the obtaining real-time traffic flow, a real-time travel time, past traffic flow, and a past travel time of the road includes: obtaining past traffic flow, a past travel time, and navigation flow within the prediction time period; and obtaining past traffic flow; a past travel time, real-time traffic flow; a real-time travel time, and navigation flow within one prior time period immediately before the prediction time period.

In some embodiments, the training a neural network with the real-time travel time, the past travel time, the real-time traffic flow; the past traffic flow, and the navigation flow of the road to obtain predicted traffic flow or a predicted travel time of the road within the prediction time period includes: performing spatio-temporal convolution on the real-time travel time, the past travel time, the real-time traffic flow; the past traffic flow; and the navigation flow of the road to obtain the predicted traffic flow or the predicted travel time of the road within the prediction time period.

In some embodiments, the performing spatio-temporal convolution on the real-time travel time, the past travel time, the real-time traffic flow; the past traffic flow, and the navigation flow of the road to obtain the predicted traffic flow of the road within the prediction time period includes: performing convolution and one-dimensional temporal convolution on the real-time travel time and the past travel time of the road to obtain a first travel time convolution result: performing one-dimensional temporal convolution on the real-time traffic flow; the past traffic flow; and the navigation flow of the road to obtain a first flow convolution result: performing spatio-graph convolution by using the first travel time convolution result and the first flow convolution result to obtain a first spatial convolution result: performing one-dimensional temporal convolution on the first spatial convolution result to obtain a first spatio-temporal coding result; and performing linear and non-linear neural network connections on the first spatio-temporal coding result to obtain the predicted traffic flow of the road within the prediction time period.

In some embodiments, the performing spatio-temporal convolution on the real-time travel time, the past travel time, the real-time traffic flow, the past traffic flow, and the navigation flow of the road to obtain the predicted travel time of the road within the prediction time period includes: performing convolution and one-dimensional temporal convolution on the real-time traffic flow, the past traffic flow, and the navigation flow of the road to obtain a second flow convolution result: performing one-dimensional temporal convolution on the real-time travel time and the past travel time to obtain a second travel time convolution result: performing spatio-graph convolution by using the second flow convolution result and the second travel time convolution result to obtain a second spatial convolution result: performing one-dimensional temporal convolution on the second spatial convolution result to obtain a second spatiotemporal coding result; and performing linear and non-linear neural network connections on the second spatio-temporal coding result to obtain the predicted travel time of the road within the prediction time period.

In some embodiments, after performing spatio-graph convolution to obtain the first spatial convolution result and before performing one-dimensional temporal convolution to obtain the first spatio-temporal coding result, the method further includes: performing spatio-graph convolution by using the first spatio-temporal coding result, the first travel time convolution result, and the first flow convolution result.

In some embodiments, when a plurality of prior time periods before the prediction time period, the training a neural network with the real-time travel time, the past travel time, the real-time traffic flow, the past traffic flow, and the navigation flow of the road to obtain predicted traffic flow or a predicted travel time of the road within the prediction time period includes: performing, according to a chronological order of the prior time periods, the following steps for each of the prior time periods: performing spatio-graph convolution on feature data of a first prior time period to obtain a spatial convolution result of the prior time period, and inputting the spatial convolution result of the prior time period, or inputting the spatial convolution result of the prior time period and a hidden state of a second prior time period prior to the first prior time period to an encoder cell unit of a recurrent neural network, to obtain a hidden state of the first prior time period; and inputting a hidden state of a last prior time period of the prior time periods and the past traffic flow, the past travel time, and the navigation flow of the road within the prediction time period to a decoder of the recurrent neural network to obtain the predicted traffic flow or the predicted travel time of the road within the prediction time period. The feature data includes a real-time travel time, a past travel time, real-time traffic flow, past traffic flow; and navigation flow of the road of each of the prior time periods.

In some embodiments, each piece of the navigation route data comprises at least a navigation end time point, a navigation road section and an entry time point of the navigation road section. The obtaining, according to the navigation route data, navigation flow of a road within a prediction time period includes: deleting, from the navigation route data, one or more pieces of navigation route data with navigation end time points earlier than a start time point of the prediction time period; and obtaining, according to navigation road sections and entry time points of the navigation road sections in remaining navigation route data after the deletion step, navigation flow entering the road within the preset prediction time period.

In some embodiments, the performing spatio-temporal convolution on the real-time travel time, the past travel time, the real-time traffic flow, the past traffic flow, and the navigation flow of the road to obtain the predicted traffic flow of the road within the prediction time period includes: performing one-dimensional temporal convolution on the real-time traffic flow, the past traffic flow; and the navigation flow of the road to obtain a first flow convolution result: performing spatio-graph convolution by using the first flow convolution result to obtain a first spatial convolution result: performing one-dimensional temporal convolution on the first spatial convolution result to obtain a first spatio-temporal coding result; and performing linear and non-linear neural network connections on the first spatio-temporal coding result to obtain the predicted traffic flow of the road within the prediction time period.

In another aspect, an apparatus is provided. The apparatus includes a memory storing computer instructions and one or more processors configured to execute the computer instructions to perform operations including: obtaining navigation route data: obtaining, according to the navigation route data, navigation flow of a road within a prediction time period: obtaining real-time traffic flow, a real-time travel time, past traffic flow, and a past travel time of the road; and training a neural network with the real-time travel time, the past travel time, the real-time traffic flow; the past traffic flow, and the navigation flow of the road to obtain predicted traffic flow or a predicted travel time of the road within the prediction time period.

In another aspect, a non-transitory computer-readable storage medium is provided. The non-transitory computer-readable storage medium stores instructions executable by a processor to cause the processor to perform operations including: obtaining navigation route data: obtaining, according to the navigation route data, navigation flow of a road within a prediction time period: obtaining real-time traffic flow, a real-time travel time, past traffic flow; and a past travel time of the road; and training a neural network with the real-time travel time, the past travel time, the real-time traffic flow; the past traffic flow, and the navigation flow of the road to obtain predicted traffic flow or a predicted travel time of the road within the prediction time period.

In this application, the navigation flow of the to-be-predicted road within the prediction time period is obtained based on the massive navigation route data returned by the terminal, and the navigation flow is used as one of features of the predicted traffic flow or the predicted travel time. Generally, a user drives according to a navigation road section given in the navigation route data. Therefore, the navigation flow of the to-be-predicted road within the prediction time period obtained based on the massive navigation route data is basically equal to an actual quantity of navigation vehicles are going to enter the road within the prediction time period. Therefore, introduction of the navigation flow greatly helps improve the accuracy of traffic flow prediction or travel time prediction. Further, in this application, the navigation route data is obtained from the terminal, that is, navigation route data being used by the terminal is accessed in the form of a real-time information flow. Once the user deviates from the navigation road section given by the navigation route data, in this application, navigation route data re-planned for the user after the deviation can be obtained from the terminal. This method ensures that the accuracy of the navigation flow introduced by this application is maintained at the highest level. Based on the foregoing reason, with the technical solutions provided in this application, predicted traffic flow or a predicted travel time period that is basically close to an actual situation can be obtained.

The foregoing description is merely an overview of the technical solutions of this application. To understand the technical means of this application more clearly, implementation can be performed according to content of the specification. Moreover, to make the foregoing and other objectives, features, and advantages of this application more comprehensible, implementations of this application are particularly described below.

BRIEF DESCRIPTION OF THE DRAWINGS

Various other advantages and benefits will become clear to a person of ordinary skill in the art by reading the following detailed description of preferred implementations. The accompanying drawings are merely intended to show the preferred implementations and are do not intended to constitute a limitation on this application. Throughout the accompanying drawings, the same reference numerals are used to represent the same components. In the drawings.

DETAILED DESCRIPTION OF EMBODIMENTS

The following describes in detail exemplary embodiments of this application with reference to the accompanying drawings. Although the accompanying drawings show the exemplary embodiments of this application, it should be understood that this application may be implemented in various manners and is not limited by the embodiments described herein. Rather, these embodiments are provided, so that this application is more thoroughly understood and the scope of this application is completely conveyed to a person skilled in the art.

Figure 1:
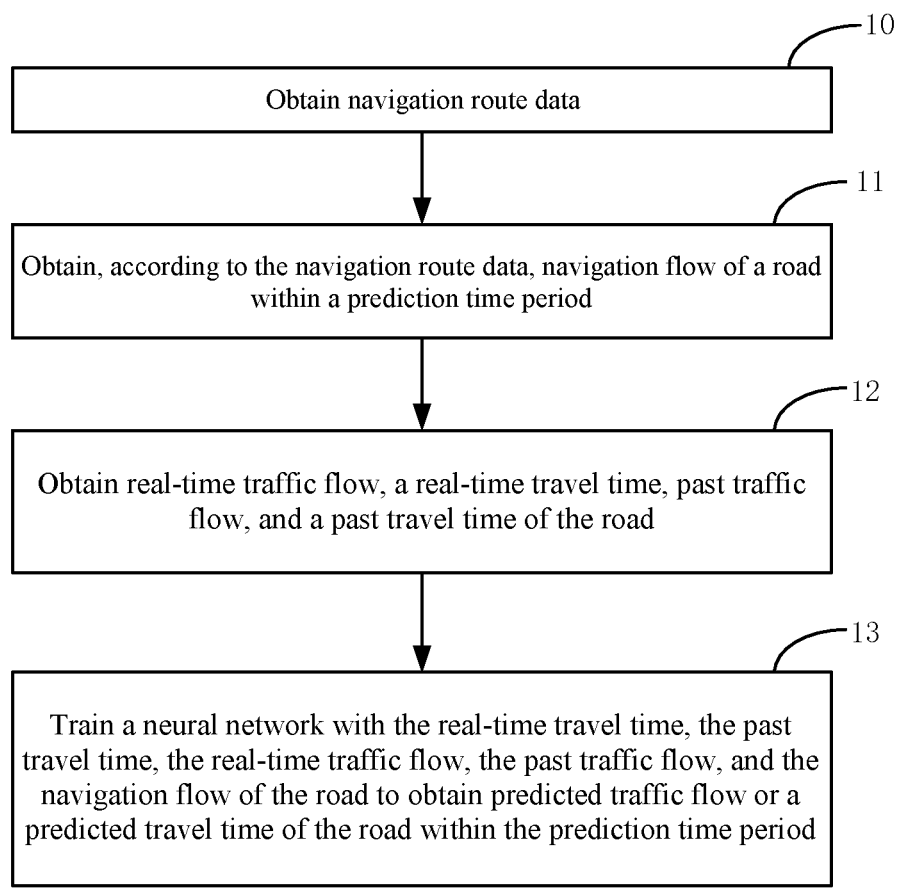
FIG. 1 shows a method for predicting traffic flow or a travel time, according to an embodiment of this application.

FIG. 1 shows a method for predicting traffic flow or a travel time according to an embodiment of this application. The method includes:

Step 10: Obtaining massive navigation route data returned by a terminal.

Step 11: Obtaining, according to the massive navigation route data, navigation flow of a to-be-predicted road within a prediction time period.

Each piece of navigation route data includes at least a navigation end time point, a navigation road section and an entry time point of the navigation road section, and in some implementations, step 11 may be implemented in the following manner:

deleting, from the massive navigation route data, navigation route data with navigation end time points earlier than a start time point of the to-be-predicted time period:

obtaining, according to navigation road sections and entry time points of the navigation road sections carried in remaining navigation route data, real-time statistical navigation flow entering the to-be-predicted road within the preset prediction time period.

Step 12: Obtaining real-time traffic flow, a real-time travel time, past traffic flow, a past travel time, and navigation flow of the to-be-predicted road.

Step 13: Training a neural network with the real-time travel time, the past travel time, the real-time traffic flow, the past traffic flow, and the navigation flow of the to-be-predicted road to obtain predicted traffic flow or a predicted travel time of the to-be-predicted road within the prediction time period.

The above is a method for predicting traffic flow or a travel time provided in an embodiment of this application. It should be noted that, in some implementations, when the massive navigation route data is returned by the terminal, step 10 and step 11 need to be performed, but step 12 is performed when a current time point is the start time point of the to-be-predicted time period. Therefore, in step 12, the navigation flow of the to-be-predicted road within the prediction time period obtained in step 11 is acquired, but there is no time sequence relationship between step 11 and step 12. Therefore, an embodiment of step 12 shown in FIG. 1 is as follows:

obtaining, when the current time point is the start time point of the prediction time period, past traffic flow, a past travel time, and navigation flow within at least one prediction time period; and obtaining past traffic flow, a past travel time, real-time traffic flow, a real-time travel time, and navigation flow within at least one prior time period, where the prior time period and the prediction time period are consecutive in time.

Figure 2:
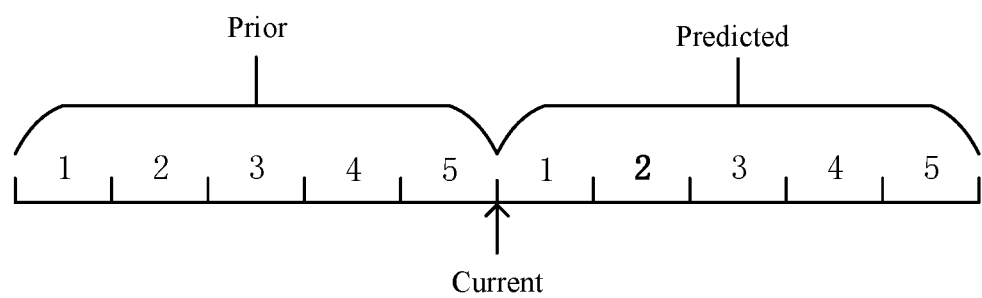
FIG. 2 is a schematic diagram of prior time periods and prediction time periods, according to an embodiment of this application.

FIG. 2 is a schematic diagram of prior time periods and prediction time periods according to an embodiment of this application, where each number represents a time period, and when there are a plurality of prediction time periods and prior time periods, according to a chronological order, the current time point is an end time point of the last prediction time period and also a start time point of the first prediction time period. As shown in FIG. 2, the current time point is an end time point of a prior time period 5 and also a start time point of a prediction time period 1. The prior time period and the prediction time period being consecutive in time means that the end time point of each time period shown in FIG. 2 is a start time point of a next time period, whether the time period is a prior time period or a prediction time period.

In this case, it can be understood that when the current time point is already a start time point of a prediction time period 2 shown in FIG. 2, the prediction time period 1 shown in FIG. 2 becomes a prior time period, that is, as time goes by, the prediction time period first becomes a prior time period and then becomes a prediction time period again. For this reason, navigation flow of the prediction time period 1 obtained in this application further includes the navigation flow of the prediction time period 1 obtained when the prior time period 1 to the prior time period 5 are the prediction time periods. This is merely an example and should not be regarded as a limitation to this application. A quantity of pieces of the navigation flow to be taken is determined by a technician according to needs, and this application does not make any limitation. In the same way, a plurality of pieces of navigation flow within the prior time periods may be obtained in this application.

An embodiment provided in this application is described in detail below:

First, one embodiment of step 13 shown in FIG. 1 is as follows: training a neural network by using spatio-temporal convolution, that is, performing spatio-temporal convolution on the real-time travel time, the past travel time, the real-time traffic flow; the past traffic flow, and the navigation flow of the to-be-predicted road to obtain the predicted traffic flow or the predicted travel time of the to-be-predicted road within the prediction time period.

For the foregoing embodiment, when a prediction target is the traffic flow; there are two implementation methods as follows:

The first method includes: performing convolution (e.g., 1*1 dimension convolution, which is also applied to other embodiments of this application) and one-dimensional temporal convolution on the real-time travel time and the past travel time of the to-be-predicted road to obtain a first travel time convolution result: performing one-dimensional temporal convolution on the real-time traffic flow, the past traffic flow, and the navigation flow of the to-be-predicted road to obtain a first flow convolution result: performing spatio-graph convolution by using the first travel time convolution result and the first flow convolution result as an input to obtain a first spatial convolution result: performing one-dimensional temporal convolution on the first spatial convolution result to obtain a first spatio-temporal coding result;

and performing linear and non-linear neural network connections on the first spatio-temporal coding result to obtain the predicted traffic flow of the to-be-predicted road within the prediction time period.

The second method includes: performing one-dimensional temporal convolution on the real-time traffic flow, the past traffic flow, and the navigation flow of the to-be-predicted road to obtain a first flow convolution result; performing spatio-graph convolution by using the first flow convolution result as an input to obtain a first spatial convolution result; performing one-dimensional temporal convolution on the first spatial convolution result to obtain a first spatio-temporal coding result; and performing linear and non-linear neural network connections on the first spatio-temporal coding result to obtain the predicted traffic flow of the to-be-predicted road within the prediction time period.

In some embodiments, in the foregoing two methods, the spatio-graph convolution and the subsequent one-dimensional temporal convolution may be performed more than once. In the case of performing the spatio-graph convolution and the one-dimensional temporal convolution for a plurality of times, it needs to obtain a first temporal coding result and then use the first spatio-temporal coding result and the input corresponding to the first spatio-temporal code result as a new input of the spatio-graph convolution, and perform this step and the subsequent one-dimensional temporal convolution again. These two steps are repeatedly performed until a quantity of executions reaches a preset quantity of executions, and the linear and non-linear neural network connections are performed for the first spatio-temporal coding result outputted by the last execution process, to obtain the predicted traffic flow of the to-be-predicted road within the prediction time period.

For the foregoing embodiment, when a prediction target is the travel time, an implementation method includes: performing convolution and one-dimensional temporal convolution on the real-time traffic flow; the past traffic flow, and the navigation flow of the to-be-predicted road to obtain a second flow convolution result; performing one-dimensional temporal convolution on the real-time travel time and the past travel time to obtain a second travel time convolution result; performing spatio-graph convolution by using the second flow convolution result and the second travel time convolution result as an input to obtain a second spatial convolution result; performing one-dimensional temporal convolution on the second spatial convolution result to obtain a second spatio-temporal coding result; and performing linear and non-linear neural network connections on the second spatio-temporal coding result to obtain the predicted travel time of the to-be-predicted road within the prediction time period.

Similar to the case where the prediction target is the traffic flow, in this embodiment, the spatio-graph convolution and the subsequent one-dimensional temporal convolution may be performed more than once. In the case of performing the spatio-graph convolution and the one-dimensional temporal convolution for a plurality of times, it needs to obtain a second temporal coding result and then use the second spatio-temporal coding result and the input corresponding to the second spatio-temporal code as a new input of the spatio-graph convolution, and perform this step and the subsequent one-dimensional temporal convolution again. These two steps are repeatedly performed until a quantity of executions reaches a preset quantity of executions, and the linear and non-linear neural network connections are performed for the second spatio-temporal coding result outputted by the last execution process, to obtain the predicted travel time of the to-be-predicted road within the prediction time period.

Another embodiment of step 13 shown in FIG. 1 may include: performing, according to a chronological order, the following steps on each of the prior time periods: performing spatio-graph convolution on feature data of one prior time period to obtain a spatial convolution result of the prior time period, and inputting the spatial convolution result of the prior time period, or the spatial convolution result of the prior time period and a hidden state of a previous prior time period to an encoder cell unit of a recurrent neural network, to obtain a hidden state of the prior time period; and inputting a hidden state of a prior time period ranked last and the past traffic flow, the past travel time, and the navigation flow of the to-be-predicted road within the prediction time period to a decoder of the recurrent neural network to obtain the predicted traffic flow or the predicted travel time of the to-be-predicted road within the prediction time period, where the feature data includes the real-time travel time, the past travel time, the real-time traffic flow, the past traffic flow, and the navigation flow of the to-be-predicted road within the prior time period.

In some implementations, whether an output of the encoder of the recurrent neural network is the predicted traffic flow or the predicted travel time depends on the setting of a target tag of the encoder. If the target tag is set to the traffic flow, the predicted traffic flow is outputted, and if the target tag is set to the travel time, the predicted travel time is outputted.

Another embodiment is introduced with reference to FIG. 2. In this application, according to a chronological order, spatio-graph convolution is first performed on feature data of a prior time period 1 to obtain a spatio-graph convolution result, and then the spatial convolution result of the prior time period 1 is inputted to the encoder cell unit of the recurrent neural network to obtain a hidden state of the prior time period 1. During processing of a prior time period 2, the difference from the processing of the prior time period 1 is that a spatial convolution result of the prior time period 2 and the hidden state of the prior time period 1 are first inputted to the encoder cell unit of the recurrent neural network to obtain a hidden state of the prior time period 2, and so on, until all prior time periods are processed.

Finally, it should be noted that, when there are a plurality of prediction time periods, during prediction of the traffic flow or the travel time in all the embodiments provided in this application, the predicted traffic flow or the predicted travel time of each prediction time period may be predicted simultaneously, or the predicted traffic flow or the predicted travel time of the prediction time period 1 shown in FIG. 2 may be predicted first, and then based on the predicted result of the prediction time period 1, prediction is performed for the prediction time period 2 in a recursive manner, and so on.

In the foregoing embodiments, description of each embodiment focuses on a different part, and for parts that are not described in detail in one embodiment, reference may be made to the related description of other embodiments.

It may be understood that for related features in the foregoing method and device, reference may be made to each other. In addition, the terms such as "first" and "second" in the foregoing embodiments are used to distinguish the embodiments, and do not imply the preference among the embodiments.

It may be clearly learned by a person skilled in the art that, for the purpose of convenient and brief description, for a detailed working process of the foregoing system, device, and unit, reference may be made to a corresponding process in the foregoing method embodiments, and details are not described herein again.

The algorithms and displays provided herein are not inherently related to any particular computer, virtual system, or other devices. Various general purpose systems can also be used together with teaching set forth herein. From the above description, the structure required to construct such a system is evidently clear. In addition, this application is not directed to any particular programming language. It should be understood that the content of this application described herein may be implemented by using various programming languages and the above description of a particular language is to disclose an optimal implementation of this application.

In addition, the memory may include the following forms of computer-readable media: a volatile memory, a random access memory (RAM), and/or a nonvolatile memory, or the like, for example, a read-only memory (ROM) or a flash memory (flash RAM), and the memory includes at least one storage chip.

A person skilled in the art should understand that the embodiments of this application may be provided as a method, a system, or a computer program product. Therefore, this application may use a form of hardware-only embodiments, software-only embodiments, or embodiments combining software and hardware. In addition, this application may use a form of a computer program product that is implemented on one or more computer-usable storage media (including but not limited to a disk memory, a CD-ROM, an optical memory, and the like) that include computer-usable program code.

This application is described with reference to flowcharts and/or block diagrams of the method, the device (system), and the computer program product according to the embodiments of this application. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

These computer program instructions may also be stored in a computer readable memory that can guide a computer or another programmable data processing device to work in a specified manner, so that the instructions stored in the computer readable memory generate a product including an instruction apparatus, where the instruction apparatus implements functions specified in one or more procedures in the flowcharts and/or one or more blocks in the block diagrams.

These computer program instructions may also be loaded into a computer or another programmable data processing device, so that a series of operations and steps are performed on the computer or another programmable data processing device, thereby generating computer-implemented processing. Therefore, the instructions executed on the computer or the another programmable data processing device provide steps for implementing functions specified in one or more procedures in the flowcharts and/or one or more blocks in the block diagrams.

In a typical configuration, a computing device includes one or more processors (CPUs), an input/output interface, a network interface, and an internal memory.

The memory may include the following forms of computer-readable media: a volatile memory, a random access memory (RAM), and/or a nonvolatile memory, or the like, for example, a read-only memory (ROM) or a flash memory (flash RAM) The memory is an example of the computer-readable medium.

The computer-readable medium includes a nonvolatile medium and a volatile medium, a removable medium and a non-removable medium, which may implement storage of information by using any method or technology. The information may be computer-readable instructions, a data structure, a module of a program, or other data. Examples of a storage medium of a computer include, but are not limited to, a phase change memory (PRAM), a static random access memory (SRAM), a dynamic random access memory (DRAM), or other types of random access memory (RAM), a read-only memory (ROM), an erasable programmable read only memory (EEPROM), a flash memory or another storage technology, a compact disc read-only memory (CD-ROM), a digital versatile disc (DVD) or another optical storage, or a cartridge tape. A magnetic storage of a magnetic tape or a disc, another magnetic storage device, or any other non-transmission medium may be configured to store information that can be accessed by a computing device. Based on the definition in this specification, the computer-readable medium does not include transitory computer-readable media (transitory media), such as a modulated data signal and a carrier.

It should also be noted that the terms "include," "comprise," and any other variants mean to cover the non-exclusive inclusion. Thereby, the process, method, article, or device that includes a series of elements not only include those elements, but also include other elements not clearly listed, or include the inherent elements of the process, method, article and device. Without further limitation, the element defined by a phrase "include one . . . " does not exclude other same elements in the process, method, article, or device that includes the element.

A person skilled in the art should understand that the embodiments of this application may be provided as a method, a system, or a computer program product. Therefore, this application may use a form of hardware-only embodiments, software-only embodiments, or embodiments combining software and hardware. In addition, this application may use a form of a computer program product that is implemented on one or more computer-usable storage media (including but not limited to a disk memory, a CD-ROM, an optical memory, and the like) that include computer-usable program code.

The foregoing descriptions are merely embodiments of this application, and are not intended to limit this application. For a person skilled in the art, various modifications and variations can be made to this application. Any modification, equivalent replacement, or improvement made without departing from the spirit and principle of this application shall fall within the scope of the claims of this application.

What is claimed is:

1. A method for predicting traffic flow or a travel time, comprising:
 obtaining navigation route data from a terminal device, wherein the navigation route data comprise navigation data collected from a plurality of vehicles;

obtaining, according to the navigation route data, navigation flow of a road within a prediction time period, wherein the navigation flow comprises an actual quantity of navigation vehicles that are going to enter the road within the prediction time period;

obtaining features of the road including real-time traffic flow, a real-time travel time, past traffic flow, and a past travel time of the road;

training a neural network with the features of the road and the navigation flow to obtain predicted traffic flow or a predicted travel time of the road within the prediction time period, wherein the training comprises:

performing one-dimensional temporal convolution on one or more of the features of the road to obtain a flow convolution result;

performing spatio-graph convolution by using the flow convolution result to obtain a spatial convolution result;

performing one-dimensional temporal convolution on the spatial convolution result to obtain a spatio-temporal coding result; and performing neural network connections on the spatio-temporal coding result to obtain the predicted traffic flow or the predicted travel time of the road within the prediction time period; and providing, in real-time, the predicted traffic flow or the predicted travel time of the road within the prediction time period through the terminal device to a vehicle for navigation.

2. The method according to claim 1, wherein the obtaining features of the road including real-time traffic flow, a real-time travel time, past traffic flow, and a past travel time of the road comprises:

obtaining past traffic flow, a past travel time, and navigation flow within the prediction time period; and obtaining past traffic flow, a past travel time, real-time traffic flow, a real-time travel time, and navigation flow within one prior time period immediately before the prediction time period.

3. The method according to claim 1, wherein the training of the neural network to obtain the predicted traffic flow of the road within the prediction time period further comprises:

performing convolution and one-dimensional temporal convolution on the real-time travel time and the past travel time of the road to obtain a first travel time convolution result;

wherein:

the performing one-dimensional temporal convolution on one or more of the features of the road to obtain a flow convolution result comprises: performing one-dimensional temporal convolution on the real-time traffic flow, the past traffic flow, and the navigation flow of the road to obtain a first flow convolution result;

the performing spatio-graph convolution by using the flow convolution result to obtain a spatial convolution result comprises: performing spatio-graph convolution by using the first travel time convolution result and the first flow convolution result to obtain a first spatial convolution result;

the performing one-dimensional temporal convolution on the spatial convolution result to obtain a spatio-temporal coding result comprises: performing one-dimensional temporal convolution on the first spatial convolution result to obtain a first spatio-temporal coding result; and the performing neural network connections on the spatio-temporal coding result comprises: performing neural network connections on the first spatio-temporal coding result to obtain the predicted traffic flow of the road within the prediction time period.

4. The method according to claim 1, wherein the training of the neural network to obtain the predicted travel time of the road within the prediction time period further comprises:

performing convolution and one-dimensional temporal convolution on the real-time traffic flow, the past traffic flow, and the navigation flow of the road to obtain a second flow convolution result;

wherein:

the performing one-dimensional temporal convolution on one or more of the features of the road to obtain a flow convolution result comprises: performing one-dimensional temporal convolution on the real-time travel time and the past travel time to obtain a second travel time convolution result;

the performing spatio-graph convolution by using the flow convolution result to obtain a spatial convolution result comprises: performing spatio-graph convolution by using the second flow convolution result and the second travel time convolution result to obtain a second spatial convolution result;

the performing one-dimensional temporal convolution on the spatial convolution result to obtain a spatio-temporal coding result comprises: performing one-dimensional temporal convolution on the second spatial convolution result to obtain a second spatio-temporal coding result; and the performing neural network connections on the spatio-temporal coding result comprises: performing neural network connections on the second spatio-temporal coding result to obtain the predicted travel time of the road within the prediction time period.

5. The method according to claim 3, wherein after obtaining the first spatial convolution result and the first spatio-temporal coding result, the method further comprises:

performing a second round of spatio-graph convolution by using the first spatio-temporal coding result, the first travel time convolution result, and the first flow convolution result.

6. The method according to claim 4, wherein after obtaining the second spatial convolution result and the second spatio-temporal coding result, the method further comprises:

performing a second round of spatio-graph convolution by using the second spatio-temporal coding result, the second flow convolution result, and the second travel time convolution result.

7. The method according to claim 1, wherein the neural network is a recurrent neural network comprising an encoder and a decoder.

8. The method according to claim 1, wherein each piece of the navigation route data comprises at least a navigation end time point, a navigation road section and an entry time point of the navigation road section, and the obtaining, according to the navigation route data, navigation flow of a road within a prediction time period comprises:

deleting, from the navigation route data, one or more pieces of navigation route data with navigation end time points earlier than a start time point of the prediction time period; and obtaining, according to navigation road sections and entry time points of the navigation road sections in remaining navigation route data after the deletion step, navigation flow entering the road within the prediction time period.

9. An apparatus comprising:
a memory storing computer instructions; and
one or more processors configured to execute the computer instructions to perform operations comprising:
obtaining navigation route data from a terminal device, wherein the navigation route data comprise navigation data collected from a plurality of vehicles;
obtaining, according to the navigation route data, navigation flow of a road within a prediction time period, wherein the navigation flow comprises an actual quantity of navigation vehicles that are going to enter the road within the prediction time period;
obtaining features of the road including real-time traffic flow, a real-time travel time, past traffic flow, and a past travel time of the road; and
training a neural network with the features of the road and the navigation flow to obtain predicted traffic flow or a predicted travel time of the road within the prediction time period, wherein the training comprises:
performing one-dimensional temporal convolution on one or more of the features of the road to obtain a flow convolution result;
performing spatio-graph convolution by using the flow convolution result to obtain a spatial convolution result;
performing one-dimensional temporal convolution on the spatial convolution result to obtain a spatio-temporal coding result; and
performing neural network connections on the spatio-temporal coding result to obtain the predicted traffic flow or the predicted travel time of the road within the prediction time period; and
providing, in real-time, the predicted traffic flow or the predicted travel time of the road within the prediction time period through the terminal device to a vehicle for navigation.

10. The apparatus according to claim 9, wherein the obtaining features of the road including real-time traffic flow, a real-time travel time, past traffic flow, and a past travel time of the road comprises:
obtaining past traffic flow, a past travel time, and navigation flow within the prediction time period; and
obtaining past traffic flow, a past travel time, real-time traffic flow, a real-time travel time, and navigation flow within one prior time period immediately before the prediction time period.

11. The apparatus according to claim 9, wherein the training of the neural network to obtain the predicted traffic flow of the road within the prediction time period further comprises:
performing convolution and one-dimensional temporal convolution on the real-time travel time and the past travel time of the road to obtain a first travel time convolution result;
wherein:
the performing one-dimensional temporal convolution on one or more of the features of the road to obtain a flow convolution result comprises: performing one-dimensional temporal convolution on the real-time traffic flow, the past traffic flow, and the navigation flow of the road to obtain a first flow convolution result;
the performing spatio-graph convolution by using the flow convolution result to obtain a spatial convolution result comprises: performing spatio-graph convolution by using the first travel time convolution result and the first flow convolution result to obtain a first spatial convolution result;
the performing one-dimensional temporal convolution on the spatial convolution result to obtain a spatio-temporal coding result comprises: performing one-dimensional temporal convolution on the first spatial convolution result to obtain a first spatio-temporal coding result; and
the performing neural network connections on the spatio-temporal coding result comprises: performing neural network connections on the first spatio-temporal coding result to obtain the predicted traffic flow of the road within the prediction time period.

12. The apparatus according to claim 9, wherein the training of the neural network to obtain the predicted travel time of the road within the prediction time period further comprises:
performing convolution and one-dimensional temporal convolution on the real-time traffic flow, the past traffic flow, and the navigation flow of the road to obtain a second flow convolution result;
wherein:
the performing one-dimensional temporal convolution on one or more of the features of the road to obtain a flow convolution result comprises: performing one-dimensional temporal convolution on the real-time travel time and the past travel time to obtain a second travel time convolution result;
the performing spatio-graph convolution by using the flow convolution result to obtain a spatial convolution result comprises: performing spatio-graph convolution by using the second flow convolution result and the second travel time convolution result to obtain a second spatial convolution result;
the performing one-dimensional temporal convolution on the spatial convolution result to obtain a spatio-temporal coding result comprises: performing one-dimensional temporal convolution on the second spatial convolution result to obtain a second spatio-temporal coding result; and
the performing neural network connections on the spatio-temporal coding result comprises: performing neural network connections on the second spatio-temporal coding result to obtain the predicted travel time of the road within the prediction time period.

13. The apparatus according to claim 11, wherein after obtaining the first spatial convolution result and the first spatio-temporal coding result, the operations further comprise:
performing a second round of spatio-graph convolution by using the first spatio-temporal coding result, the first travel time convolution result, and the first flow convolution result.

14. The apparatus according to claim 12, wherein after obtaining the second spatial convolution result and the second spatio-temporal coding result, the operations further comprise:
performing a second round of spatio-graph convolution by using the second spatio-temporal coding result, the second flow convolution result, and the second travel time convolution result.

15. The apparatus according to claim 9, wherein each piece of the navigation route data comprises at least a navigation end time point, a navigation road section and an entry time point of the navigation road section, and the obtaining, according to the navigation route data, navigation flow of a road within a prediction time period comprises:

deleting, from the navigation route data, one or more pieces of navigation route data with navigation end time points earlier than a start time point of the prediction time period; and obtaining, according to navigation road sections and entry time points of the navigation road sections in remaining navigation route data after the deletion step, navigation flow entering the road within the prediction time period.

16. A non-transitory computer-readable storage medium storing instructions executable by a processor to cause the processor to perform operations comprising:

obtaining navigation route data from a terminal device, wherein the navigation route data comprise navigation data collected from a plurality of vehicles;

obtaining, according to the navigation route data, navigation flow of a road within a prediction time period, wherein the navigation flow comprises an actual quantity of navigation vehicles that are going to enter the road within the prediction time period;

obtaining features of the road including real-time traffic flow, a real-time travel time, past traffic flow, and a past travel time of the road;

training a neural network with the features of the road and the navigation flow to obtain predicted traffic flow or a predicted travel time of the road within the prediction time period, wherein the training comprises:

performing one-dimensional temporal convolution on one or more of the features of the road to obtain a flow convolution result;

performing spatio-graph convolution by using the flow convolution result to obtain a spatial convolution result;

performing one-dimensional temporal convolution on the spatial convolution result to obtain a spatio-temporal coding result; and performing neural network connections on the spatio-temporal coding result to obtain the predicted traffic flow or the predicted travel time of the road within the prediction time period; and providing, in real-time, the predicted traffic flow or the predicted travel time of the road within the prediction time period through the terminal device to a vehicle for navigation.

17. The non-transitory computer-readable storage medium according to claim 16, wherein the obtaining features of the road including real-time traffic flow, a real-time travel time, past traffic flow, and a past travel time of the road comprises:

obtaining past traffic flow, a past travel time, and navigation flow within the prediction time period; and obtaining past traffic flow, a past travel time, real-time traffic flow, a real-time travel time, and navigation flow within one prior time period immediately before the prediction time period.

\* \* \* \* \*